United States Patent
Wang et al.

(10) Patent No.: US 11,349,540 B2
(45) Date of Patent: May 31, 2022

(54) BEAM ALLOCATION METHOD AND APPARATUS

(71) Applicant: HUAWEI TECHNOLOGIES CO., LTD., Shenzhen (CN)

(72) Inventors: Fei Wang, Chengdu (CN); Longke He, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 6 days.

(21) Appl. No.: 15/931,457

(22) Filed: May 13, 2020

(65) Prior Publication Data
US 2020/0274589 A1 Aug. 27, 2020

Related U.S. Application Data

(63) Continuation of application No. PCT/CN2017/112293, filed on Nov. 22, 2017.

(51) Int. Cl.
*H04B 7/06* (2006.01)
*H04B 17/318* (2015.01)
(Continued)

(52) U.S. Cl.
CPC .......... *H04B 7/0617* (2013.01); *H04B 1/38* (2013.01); *H04B 7/0456* (2013.01);
(Continued)

(58) Field of Classification Search
CPC ...... H04B 7/0617; H04B 17/318; H04B 1/38; H04B 7/0456; H04B 7/0632;
(Continued)

(56) References Cited

U.S. PATENT DOCUMENTS

| 2012/0021688 A1 | 1/2012 | Bhattad et al. |
| 2015/0055689 A1 | 2/2015 | Tarighat Mehrabani et al. |

(Continued)

FOREIGN PATENT DOCUMENTS

| CN | 1437420 A | 8/2003 |
| CN | 101848021 A | 9/2010 |

(Continued)

OTHER PUBLICATIONS

Samsung,"MIMO/beamforming for 5G new radio interface for over-6GHz: system architecture and design aspects",3GPP TSG RAN WG1 #84bis,R1-162183,Busan, Korea, Apr. 11-15, 2016, total 7 pages.

*Primary Examiner* — Fitwi Y Hailegiorgis
(74) *Attorney, Agent, or Firm* — Stein IP, LLC

(57) ABSTRACT

A beam allocation method and apparatus, relating to the field of communications. The method includes: determining a first network device set, where the first network device set includes to-be-scheduled first network devices; allocating transceivers in a second network device to n first network devices in the first network device set, where n≥2; and respectively allocating n beams in different directions simultaneously generated by the transceiver to the n first network devices, where the n first network devices occupy different subbands in a frequency band corresponding to the beams. In this application, coverage of a beam during an instance during scheduling may be expanded. In addition, users may simultaneously transmit data, and there is no waiting latency.

16 Claims, 4 Drawing Sheets

(51) Int. Cl.
  *H04B 1/38*  (2015.01)
  *H04B 7/0456*  (2017.01)
  *H04L 1/00*  (2006.01)

(52) U.S. Cl.
  CPC ......... *H04B 7/0632* (2013.01); *H04B 17/318* (2015.01); *H04L 1/0003* (2013.01)

(58) Field of Classification Search
  CPC ... H04B 7/0686; H04B 7/0452; H04L 1/0003; H04W 16/28
  USPC .......................................................... 375/329
  See application file for complete search history.

(56)  References Cited

U.S. PATENT DOCUMENTS

2015/0131616 A1  5/2015  Jo et al.
  2016/0315680 A1*  10/2016  Braun .................. H04B 7/0617
  2018/0139014 A1*  5/2018  Xiong .................. H04L 5/0091
  2019/0320434 A1*  10/2019  You ....................... H04L 1/0009

FOREIGN PATENT DOCUMENTS

CN      102196582 A    9/2011
  CN      106998223 A    8/2017
  CN      107257585 A   10/2017
  CN      107294575 A   10/2017
  WO     2017012803 A1   1/2017

* cited by examiner

BEAM ALLOCATION METHOD AND APPARATUS

CROSS-REFERENCE TO RELATED APPLICATIONS

This application is a continuation of International Application No. PCT/CN2017/112293, filed on Nov. 22, 2017, the disclosure of which is hereby incorporated by reference in its entirety.

TECHNICAL FIELD

Aspects of this application relate to the field of communications, and in particular, to a beam allocation method and apparatus.

BACKGROUND

A transceiver (TRX) of a high-frequency antenna in a base station stores four groups of antenna weights, and each group of antenna weights corresponds to one beam direction. In this way, the TRX may select one group of antenna weights each time to generate a beam in one direction. The base station may allocate these beams to user equipment, so that the user equipment transmits data by using the beams.

In the related art, the base station first determines to-be-scheduled user equipments. If there are n user equipments having high priorities in the to-be-scheduled user equipments, the base station sorts the n user equipments based on the priorities of the user equipments, sequentially selects unscheduled user equipment having a highest priority from the n user equipments, and cyclically performs the following steps: determining, based on configuration information, a quantity of TRXs required by the user equipment, then, allocating one or more TRXs to the user equipment based on the quantity of TRXs required by the user equipment, selecting a group of antenna weights by using each allocated TRX to generate a beam pointing to a direction of the user equipment, to obtain a cell beam set of a cell in which the user equipment is located, matching the to-be-scheduled user equipments in the cell with the cell beam set, to determine whether the cell beam set can meet a scheduling performance requirement of the user equipment, and allocating, if the cell beam set can meet the scheduling performance requirement of the user equipment, the beam to the to-be-scheduled user equipments.

One TRX can generate only a beam in one direction in a single moment. Therefore, a scheduling area is limited by the quantity of TRXs. In a large array scenario corresponding to a high frequency, a beam is relatively narrow, and beam coverage is limited. In addition, there is a waiting latency for user equipment within the coverage of a beam in another direction generated by the TRX.

SUMMARY

Embodiments of this application provide a beam allocation method and apparatus, to resolve the problem that beam coverage generated by a TRX is limited in direction during scheduling, and a waiting latency exists for a user within the coverage of a beam transitioning in another direction. A technical solution is as follows:

According to a first aspect, a beam allocation method is provided. The method includes: determining a first network device set, the first network device set includes n to-be-scheduled first network devices, where n≥2; allocating transceivers in a second network device to the n first network devices in the first network device set; and respectively allocating n beams in different directions simultaneously generated by the transceiver to the n first network devices, where the n first network devices occupy different subbands in a frequency band corresponding to the beams.

One TRX may simultaneously generate n beams in different directions during an instance of scheduling. Because the coverage of the n beams in the different directions is greater than the coverage of one beam, beam coverage in a single instance of scheduling may be expanded. In addition, users within the coverage of the beams in the different directions generated by the TRX can all simultaneously transmit data, and there is no waiting latency.

In a possible implementation solution, before respectively allocating the n beams in different directions simultaneously generated by the transceiver to the n first network devices, the method further includes: performing linear superposition on n groups of antenna weights in the transceiver to obtain superposed weights, where one group of antenna weights is used to generate a beam in one direction; and simultaneously generating the n beams in the different directions based on the superposed weights by using the transceiver.

Linear superposition is performed on the n groups of antenna weights so that the transceiver can simultaneously generate then beams in the different directions based on the obtained superposed weights. In this way, beam coverage during an instance of scheduling can be expanded, and a waiting latency can be avoided.

In a possible implementation solution, the allocating transceivers in the second network device to n first network devices in a first network device set includes: sequentially allocating, when the second network device is a second network device in a single-user scenario, all transceivers in the second network device to the first network device in descending order of priorities of the n first network devices in the first network device set; or sequentially determining, when the second network device is a second network device in a multi-user scenario, a quantity m of transceivers required by the first network device in descending order of priorities of the n first network devices in the first network device set, and allocating m transceivers to the first network device, where m≥1.

In a possible implementation solution, when the second network device is the second network device in the single-user scenario, the respectively allocating n beams in different directions simultaneously generated by the transceiver to the n first network devices includes: selecting a target beam of an $i^{th}$ first network device in the n first network devices from the beams generated by each transceiver, and adding a target beam of the $i^{th}$ first network device and a gain loss of the target beam to a beam set, where i≥1; selecting, for each target beam, a $j^{th}$ first network device that is in the first network device set and that is within the coverage of the target beam, estimating resource blocks required by all first network devices that can be scheduled within the coverage of the target beam, and determining, if the resource blocks do not fully occupy a frequency band corresponding to the target beam, whether a modulation and coding scheme MCS of each of all the first network devices that can be scheduled within the coverage of the target beam is higher than an admission threshold; allocating, when each MCS is higher than the admission threshold, the target beam to the $j^{th}$ first network device, and updating j to j+1; and continuing to perform the step of selecting a $i^{th}$ first network device that is in the first network device set and that is within the coverage of the target beam, until the resource blocks fully occupy the frequency band, or until the target beam is allocated to all the first network devices within the coverage of the target beam, the resource blocks still do not fully occupy the frequency band, and each MCS is higher than the admission threshold, and stopping beam allocation, where j≥1; updating i to i+1 after the target beam is allocated to all the first network devices within the coverage of the target beam and when the resource blocks still do not fully occupy the frequency band and each MCS is higher than the admission threshold, selecting the target beam of the $i^{th}$ first network device from the beams generated by each transceiver, updating a gain loss of a target beam already allocated by each transceiver, calculating a capacity gain of a data amount of first network devices that can be currently scheduled relative to a data amount of the first network devices that can be scheduled before the target beam is allocated to the $i^{th}$ first network device, adding, when the capacity gain is positive, the target beam of the $i^{th}$ first network device and the gain loss of the target beam to the beam set, and updating gain losses of corresponding target beams in the beam set; and continuing to perform the step of selecting, for each target beam, a $j^{th}$ first network device that is in the first network device set and that is within coverage of the target beam, until frequency bands corresponding to all target beams are all fully occupied, or until the capacity gain is not positive, and stopping beam allocation.

The target beam may be an optimal beam.

After a beam is allocated to a first network device, if a data amount of the user is relatively small, a user scheduling resource of the beam cannot fully occupy a wide frequency band corresponding to an entire high frequency, resulting in relatively low spectrum utilization. Therefore, the beam needs to be allocated to another first network device within the coverage of the beam. In this way, a plurality of users all transmit data by using the beam. This can improve spectrum utilization.

In a possible implementation solution, when the second network device is the second network device in the multi-user scenario, the respectively allocating n beams in different directions simultaneously generated by the transceiver to the n first network devices includes: selecting a target beam of an $i^{th}$ first network device in the n first network devices from the beams generated by each transceiver, and determining whether interference exists between the selected target beam and an already allocated target beam, where i≥2; allocating, when no interference exists between the selected target beam and the already allocated target beam, the selected target beam to the $i^{th}$ first network device, adding the target beam of the $i^{th}$ first network device and a gain loss of the target beam to a beam set, updating i to i+1, and continuing to perform the step of selecting a target beam of an $i^{th}$ first network device in then first network devices from the beams generated by the transceiver; or forbidding, when interference exists between the selected target beam and the already allocated target beam, allocating the selected target beam to the $i^{th}$ first network device; selecting, for each already allocated target beam, a $j^{th}$ first network device within the coverage of the already allocated target beam in the first network device set, estimating resource blocks required by all first network devices that can be scheduled within the coverage of the target beam, and determining, if the resource blocks do not fully occupy a frequency band corresponding to the already allocated target beam, whether an MCS of each of all the first network devices that can be scheduled within the coverage of the target beam is higher than an admission threshold; allocating, when each MCS is higher than the admission threshold, the already allocated target beam to the $j^{th}$ first network device, and updating j to j+1; and continuing to perform the step of selecting a $j^{th}$ first network device within the coverage of the allocated target beam in the first network device set, until the resource blocks fully occupy the frequency band, or until the target beam is allocated to all the first network devices within the coverage of the target beam, the resource blocks still do not occupy the frequency band, and each MCS is higher than the admission threshold, and stopping beam allocation, where j≥1; searching for m transceivers after the target beam is allocated to all the first network devices within the coverage of the target beam and when the resource blocks still do not fully occupy the frequency band and each MCS is higher than the admission threshold, where all target beams generated by the m transceivers have lowest resource utilization; selecting the target beam of the $i^{th}$ first network device from the beams generated by each transceiver, updating a gain loss of a target beam already allocated by the m transceivers, calculating a capacity gain of a data amount of first network devices that can be currently scheduled relative to a data amount of the first network devices that can be scheduled before the target beam is allocated to the $i^{th}$ first network device, adding, when the capacity gain is positive, the target beam of the $i^{th}$ first network device and a gain loss of the target beam to the beam set, and updating gain losses of corresponding target beams in the beam set; and updating i to i+1; and continuing to perform the step of selecting a target beam of an $i^{th}$ first network device in the n first network devices from the beams generated by each transceiver, until frequency bands corresponding to all target beams are all fully occupied, or until the capacity gain is not positive, and stopping beam allocation.

After a beam is allocated to a first network device, if a data amount of the user is relatively small, a user scheduling resource of the beam cannot fully occupy a wide frequency band corresponding to an entire high frequency, resulting in relatively low spectrum utilization. Therefore, the beam needs to be allocated to another first network device within the coverage of the beam. In this way, a plurality of users all transmit data by using the beam. This can improve spectrum utilization.

In a possible implementation solution, when i=1 and the second network device is the second network device in the multi-user scenario, the respectively allocating n beams in different directions simultaneously generated by the transceiver to the n first network devices further includes: selecting a target beam of the $1^{st}$ first network device from the beams generated by the transceiver; allocating the target beam to the $1^{st}$ first network device; adding the target beam of the $1^{st}$ first network device and a gain loss of the target beam to a beam set; and updating i to i+1, to trigger the execution of the step of selecting a target beam of an $i^{th}$ first network device in the n first network devices from the beams generated by each transceiver, and determining whether interference exists between the selected target beam and an already allocated target beam.

In a possible implementation solution, when the second network device is the second network device in the multi-user scenario, before the allocating m transceivers to the first network device, the method further includes: determining whether target beams already allocated by the transceiver include a beam that can be reused by the $i^{th}$ first network device in the n first network devices; and, when the target beams already allocated by the transceiver do not include the beam that can be reused by the $i^{th}$ first network device, triggering execution of the step of allocating m transceivers to the first network device; or allocating the beam to the first network device when the target beams already allocated by the transceiver include the beam that can be reused by the $i^{th}$ first network device, updating i to i+1, and continuing to perform the step of sequentially determining a quantity m of transceivers required by each first network device.

When the $i^{th}$ first network device can reuse an already allocated beam, the already allocated beam may be directly allocated to the first network device, to improve spectrum utilization and beam allocation efficiency.

In a possible implementation solution, the method further includes: controlling, after beam allocation is stopped, a first network device within the coverage of each target beam in the beam set to measure a channel quality indicator CQI of the first network device, and adjusting an MCS of the first network device based on the CQI and a gain loss of the target beam.

After the beam allocation is stopped, the first network device is controlled to adjust an MCS. In this way, the first network device may modulate and encode data based on the actual channel quality of a beam, so that encoded data is suitable for being transmitted on the beam. This improves a data transmission success rate.

In a possible implementation solution, the selecting a target beam of an $i^{th}$ first network device in the n network devices from the beams generated by each transceiver includes: sequentially selecting one of n groups of antenna weights by using each transceiver, and generating, based on the antenna weights, a beam whose direction points to the $i^{th}$ first network device; receiving n beam reference signal received powers (RSRPs) that correspond to each transceiver and that are sent by the $i^{th}$ first network device, where each RSRP corresponds to one beam generated by the transceiver; and selecting one RSRP having the greatest value from the n RSRPs corresponding to each transceiver, and using a beam corresponding to the RSRP as the target beam of the $i^{th}$ first network device.

The RSRP is used to represent beam quality, and a beam corresponding to one RSRP having a highest value in n RSRPs that correspond to each transceiver is used as the target beam of the $i^{th}$ first network device, so that the first network device can transmit data on a beam having the best quality. This improves a data transmission success rate.

In a possible implementation solution, the estimating resource blocks required by all first network devices that can be scheduled within the coverage of the target beam, the method further includes: calculating, based on a preset beam weight coefficient, a first decreasing value that a gain of the target beam has when the target beam is allocated to the $j^{th}$ first network device; searching a preset mapping table for a second decreasing value of an MCS corresponding to the first decreasing value, where the mapping table is used to reflect a correspondence between the first decreasing value of the gain of the target beam and the second decreasing value of the MCS; decreasing MCSs of all the first network devices that can be scheduled within the coverage of the target beam by the second decreasing value, and estimating, based on a decreased MCS of each first network device, a resource block required by the first network device; and summating resource blocks required by all the first network devices to obtain the resource blocks required by all the first network devices that can be scheduled.

According to a second aspect, a transceiver is provided. The transceiver is located in a second network device, and the transceiver includes an antenna array. The antenna array is configured to obtain a parameter output by a processor in the second network device; and the antenna array is further configured to simultaneously generate n beams in different directions based on the parameter, where n≥2.

In a possible implementation solution, the weight parameter is obtained by the second network device by performing linear superposition on n groups of antenna weights in the transceiver, and one group of weights is used to generate a beam in one direction.

According to a third aspect, a beam allocation apparatus is provided. The apparatus has a function of implementing the beam allocation method provided in the first aspect and the possible implementation solutions of the first aspect. The function may be implemented by hardware, or may be implemented by hardware by executing corresponding software. The hardware or the software includes one or more units corresponding to the foregoing function.

According to a fourth aspect, a beam allocation apparatus is provided. The apparatus includes a processor and a memory connected to the processor. The processor in the device executes a program or an instruction stored in the memory, to implement the beam allocation method provided in the first aspect and the possible implementation solutions of the first aspect.

According to a fifth aspect, a computer-readable storage medium is provided. The storage medium stores at least one instruction, at least one program, a code set, or an instruction set, and the at least one instruction, the at least one program, the code set, or the instruction set is loaded and executed by a processor to implement any beam allocation method in the first aspect.

DESCRIPTION OF EMBODIMENTS

To make the objectives, technical solutions, and advantages of this application clearer, the following further describes in detail some implementations of this application with reference to the accompanying drawings.

Figure 1:
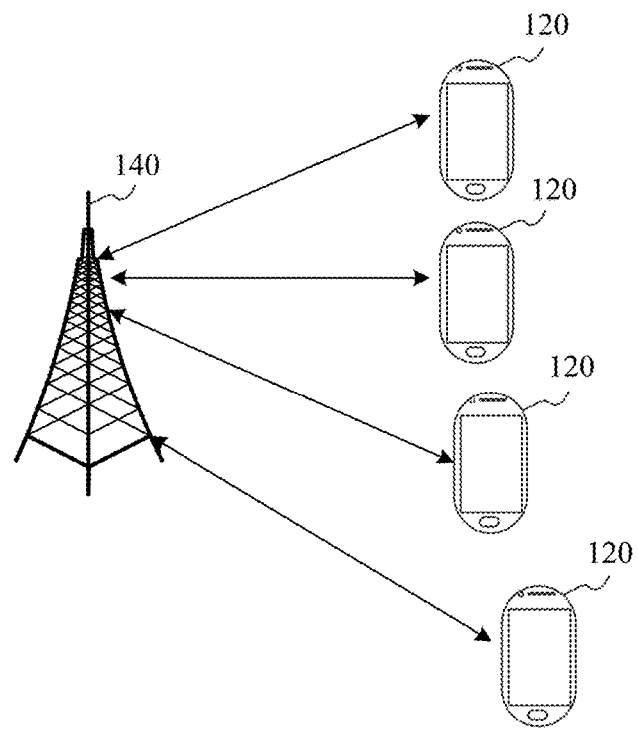
FIG. 1 is a schematic diagram of a communications system according to an example embodiment of this application.

FIG. 1 is a schematic diagram of a communications system 100 according to an example embodiment of this application. The communications system 100 includes a first network device 120 and a second network device 140.

The communications system 100 may be applied to a digital hybrid beamforming (HDBF) structure or an integrated antenna (Antenna In Package, AIP) structure. Optionally, in a scenario in which a quantity of ports of antennas during scheduling is higher than or equal to 8, the beam coverage during scheduling is also relatively large, and users within the coverage of a plurality of beams can all simultaneously transmit data. Therefore, when the quantity of ports of the antennas during scheduling is higher than or equal to 8, an effect of using this application is not obvious. Therefore, this application may be further applied to a scenario in which a quantity of ports of antennas during scheduling is less than 8.

The communications system 100 may further be a 4G system of a 4th generation mobile communications technology (4G) or a 5G system of a 5th generation mobile communications technology (5G). When the communications system 100 is the 4G system, the first network device 120 may be user equipment (UE), and the second network device 140 may be an evolved NodeB (eNB). When the communications system 100 is the 5G system, the first network device 120 may be UE, and the second network device 140 may be a 5G base station gNB. In this case, all users within coverage of beams in different directions simultaneously generated by a TRX can all simultaneously transmit data, and there is no waiting latency. Therefore, this application is applicable to an ultra-reliable low-latency communication (URLLC) scenario in 5G.

The UE may be implemented as a terminal. A terminal 120 may be a mobile phone (cellphone), a smartphone, a computer, a tablet computer, a wearable device, a personal digital assistant (PDA), a mobile internet device MID, an e-book reader, or the like.

A second network device 140 may access a plurality of first network devices 120. In FIG. 1, an example in which a second network device 140 accesses four first network devices 120 is merely used for description. That the second network device 140 accesses the first network device 120 means that the second network device 140 establishes a connection to the first network device 120, and the first network device 120 provides a communication service for the second network device 140.

Figure 2:
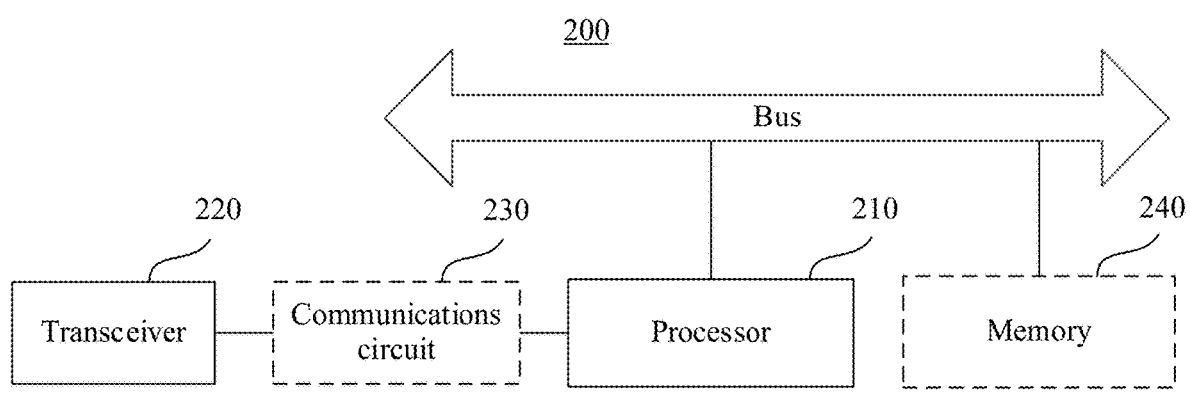
FIG. 2 is a schematic structural diagram of a second network device according to an example embodiment of this application.

FIG. 2 is a schematic structural diagram of a second network device 200 according to an example embodiment of this application. The second network device 200 may be the second network device 140 shown in FIG. 1. The second network device may include a processor 220 and a wireless transceiver 240 connected to the processor 220.

The wireless transceiver 240 may include one or more antennas, and the antenna enables the second network device 200 to send or receive a radio signal. Each antenna may include one transceiver, each transceiver includes n groups of antenna weights, and the transceiver may simultaneously generate n beams in different directions based on superposed weights obtained by superposing the n groups of antenna weights.

The wireless transceiver 240 may be connected to a communications circuit 260. The communications circuit 260 may perform various processing on a signal received by the wireless transceiver 240 or sent by the wireless transceiver 240, for example, modulate a signal sent by the wireless transceiver 240, and demodulate a signal received by the wireless transceiver 240. During actual implementation, the communications circuit 260 may include a radio frequency (RF) chip and a baseband chip.

The communications circuit 260 may be connected to the processor 220. The communications circuit 260 that is replaceable may be integrated in the processor 220. The processor 220 may be a control center of the second network device, and the processor 220 may be a central processing unit (CPU), a network processor (NP), or a combination of a CPU and an NP. The processor 220 may further include a hardware chip. The hardware chip may be an application-specific integrated circuit (ASIC), a programmable logic device (PLD), or a combination thereof. The PLD may be a complex programmable logic device (CPLD), a field programmable gate array (FPGA), a generic array logic (GAL), or any combination thereof.

A memory 280 is connected to the processor 220 by using a bus or in another manner. The memory 280 may be a volatile memory, a non-volatile memory, or a combination thereof. The volatile memory may be a random access memory (RAM), for example, a static random access memory (SRAM), or a dynamic random access memory (DRAM). The non-volatile memory may be a read-only memory (ROM), for example, a programmable read-only memory (PROM), an erasable programmable read-only memory (EPROM), or an electrically erasable programmable read-only memory (EEPROM). The non-volatile memory may alternatively be a flash memory, and a magnetic memory, for example, a magnetic tape, a floppy disk, or a hard disk. Alternatively, the non-volatile memory may be a compact disc.

The memory 280 may store information such as a quantity of TRXs required by the first network device, a beam that can be reused by the first network device, and whether multi-beam scheduling is enabled.

Figure 3:
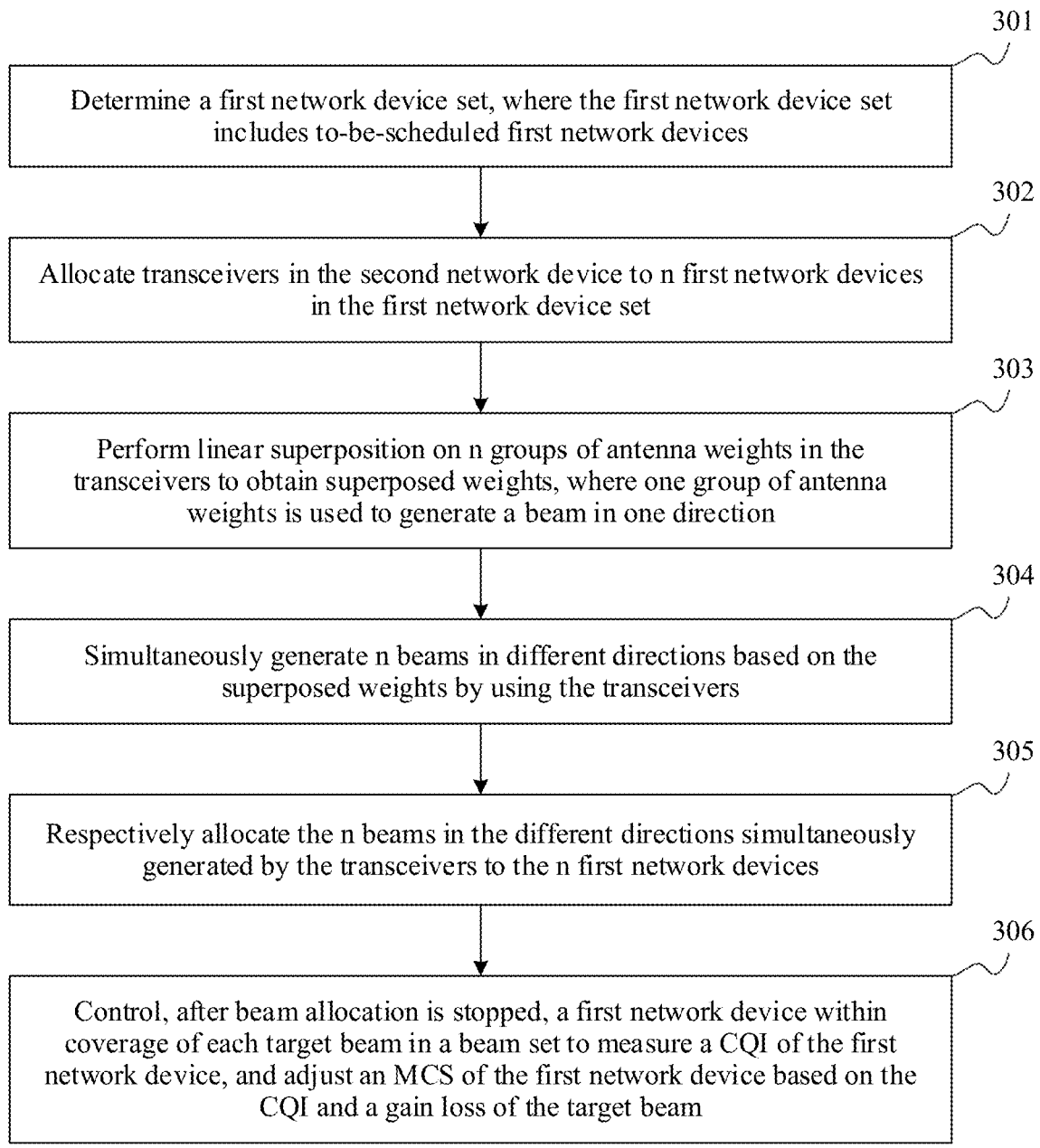
FIG. 3 is a method flowchart of a beam allocation method according to an example embodiment of this application.

FIG. 3 is a flowchart of a beam allocation method according to an example embodiment of this application. This embodiment is described by using an example in which the method is applied to the communications system shown in FIG. 1. A second network device performs the following steps. The method includes the following several steps.

Step 301: Determine a first network device set, where the first network device set includes to-be-scheduled first network devices.

The to-be-scheduled first network device is a first network device that currently needs to transmit data by using a beam generated by a transceiver in the second network device.

After determining the to-be-scheduled first network devices, the second network device determines priorities of the to-be-scheduled first network devices, sorts the to-be-scheduled first network devices in descending order of the priorities, and combines all the sorted to-be-scheduled first network devices to form the first network device set.

Step 302: Allocate transceivers in the second network device to n first network devices in the first network device set.

n≥2.

This embodiment may be applied to a single-user scenario, or may be applied to a multi-user scenario. The following separately describes transceiver allocation manners in the two scenarios.

In the first scenario, when the second network device is a second network device in the single-user scenario, all transceivers in the second network device are sequentially allocated to the first network device in descending order of priorities of the n first network devices in the first network device set.

In the single-user scenario, the second network device allocates all the transceivers to the first network device. In an allocation process, the second network device first selects a first network device having a highest priority from the first network device set, allocates all the transceivers to the first network device, searches, after all the transceivers allocate beams to the first network device, the first network device set for a first network device that can be scheduled within the coverage of each beam that is allocated this time, and allocates each beam to the corresponding first network device that can be scheduled. Then, the second network device selects a first network device having a highest priority other than the first network device to which the beams have been allocated from the first network device set, allocates all the transceivers to the first network device, searches, after all the transceivers allocate beams to the first network device, the first network device set for a first network device that can be scheduled within the coverage of each beam that is allocated this time, and allocates the beam to the corresponding first network device that can be scheduled. The foregoing steps are cyclically performed until a beam is allocated to each first network device in the first network device set. In this embodiment, it is assumed that the second network device allocates all the transceivers to the n first network devices.

A first network device that can be scheduled within the coverage of a beam means that a cell in which the first network device is located is covered by the beam, and the beam can meet a scheduling performance requirement of the first network device.

In the second scenario, when the second network device is a second network device in the multi-user scenario, a quantity m of transceivers required by each first network device is sequentially determined in descending order of priorities of the n first network devices in the first network device set, and m transceivers are allocated to the first network device, where $m \geq 1$.

In the multi-user scenario, the second network device allocates the transceivers required by the first network device to the first network device. In an allocation process, the second network device first selects a first network device having a highest priority from the first network device set, determines a quantity m of transceivers required by the first network device, allocates m transceivers to the first network device, searches, after the m transceivers allocate beams to the first network device, the first network device set for a first network device that can be scheduled within the coverage of each beam that is allocated this time, and allocates the beam to the corresponding first network device that can be scheduled. Then, the second network device selects a first network device having a highest priority other than the first network device to which the beams have been allocated from the first network device set, determines a quantity m of transceivers required by the first network device, allocates m transceivers to the first network device, searches, after the m transceivers allocate beams to the first network device, the first network device set for a first network device that can be scheduled within the coverage of each beam that is allocated this time, and allocates the beam to the corresponding first network device that can be scheduled. The foregoing steps are cyclically performed until a beam is allocated to each first network device in the first network device set. In this embodiment, it is assumed that the second network device allocates all transceivers to the n first network devices, and quantities m of transceivers required by the first network devices may be the same or different. This is not limited in this embodiment.

Optionally, when the second network device is the second network device in the multi-user scenario, before allocating m transceivers to the first network device, the method further includes: determining whether target beams allocated by the transceiver include a beam that can be reused by an $i^{th}$ first network device in the n first network devices; and when the target beams allocated by the transceiver do not include the beam that can be reused by the $i^{th}$ first network device, triggering execution of the step of allocating m transceivers to the first network device; or allocating, when the target beams allocated by the transceiver include the beam that can be reused by the $i^{th}$ first network device, the beam to the first network device, updating i to i+1, and continuing to perform the step of sequentially determining a quantity m of transceivers required by each first network device.

The target beam may be an optimal beam.

The second network device stores a beam available to each first network device. The second network device determines whether allocated beams include the beam, and determines, when the allocated beams include the beam, that the allocated beams include the beam that can be reused by the $i^{th}$ first network device, or determines, when the allocated beams do not include the beam, that the allocated beams do not include the beam that can be reused by the $i^{th}$ first network device.

The allocated beams include a beam allocated at a previous time, and may further include a beam that is allocated before beam allocation is performed at the previous time, where resource blocks required by users that can be scheduled within the coverage of the beam do not fully occupy a frequency band corresponding to the beams. This is not limited to this embodiment.

When the $i^{th}$ first network device can reuse an already allocated beam, the already allocated beam may be directly allocated to the first network device, to improve spectrum utilization and beam allocation efficiency.

Step 303: Perform linear superposition on n groups of antenna weights in the transceiver to obtain superposed weights, where one group of antenna weights is used to generate a beam in one direction.

The antenna weight may be a discrete Fourier transform (DFT) weight, a Chebyshev weight, or another weight. This is not limited to this embodiment.

An algorithm for performing linear superposition on antenna weights in the related art is already very mature, and details are not described herein.

Step 304: Simultaneously generate n beams in different directions based on the superposed weights by using the transceiver.

The transceiver may generate a beam having n main lobes (or a beam having n peaks). Because directions of the main lobes are different, the beam having the n main lobes may also be referred to as beams in n different directions.

In an implementation, the second network device includes a processor, and the transceiver includes an antenna array. Because the transceiver is located in the second network device, the processor in the second network device may be directly or indirectly connected to the antenna array in the transceiver. In this case, the antenna array may obtain superposed weights output by the processor, and generate n beams in different directions based on the superposed weights.

Step 305: Respectively allocate n beams in different directions simultaneously generated by the transceiver to the n first network devices.

In this embodiment, because the n first network devices simultaneously transmit data by using beams generated by one transceiver, to distinguish between the first network devices, the n first network devices occupy different subbands in a frequency band corresponding to the beams. That is, users within the coverage of beams in different directions generated by one transceiver are staggered through frequency division.

This embodiment may be applied to a single-user scenario, or may be applied to a multi-user scenario. The following separately describes beam allocation manners in the two scenarios.

First, when the second network device is a second network device in the single-user scenario, the respectively allocating n beams in different directions simultaneously generated by the transceiver to the n first network devices includes the following steps.

(1) Select a target beam of an $i^{th}$ first network device in the n first network devices from beams generated by each transceiver, and add the target beam of the $i^{th}$ first network device and a gain loss of the target beam to a beam set, where $i \geq 1$.

The selecting a target beam of an $i^{th}$ first network device in the n first network devices from beams generated by each transceiver includes: sequentially selecting one group of antenna weights in the n groups of antenna weights by using each transceiver, and generating, based on the antenna weights, a beam whose direction points to the $i^{th}$ first network device; receiving n beam reference signal received powers (RSRP) that correspond to each transceiver and that are sent by the $i^{th}$ first network device, where each RSRP corresponds to one beam generated by the transceiver; and selecting one RSRP having the highest value from the n RSRPs that correspond to each transceiver, and using a beam corresponding to the RSRP as the target beam of the $i^{th}$ first network device.

For example, the second network device includes two transceivers, and each transceiver includes four groups of antenna weights. In this case, the first transceiver first selects the first group of antenna weights to generate a beam 1 pointing to a first network device, and the first network device measures an RSRP 1 of the beam 1; then, the transceiver selects the second group of antenna weights to generate a beam 2 pointing to the first network device, and the first network device measures an RSRP 2 of the beam 2; then, the transceiver selects the third group of antenna weights to generate a beam 3 pointing to the first network device, and the first network device measures an RSRP 3 of the beam 3; and then, the transceiver selects the fourth group of antenna weights to generate a beam 4 pointing to the first network device, and the first network device measures an RSRP 4 of the beam 4. Similarly, the first network device may obtain an RSRP 5 to an RSRP 8 of four beams generated by the second transceiver. The first network device sends the RSRP 1 to the RSRP 8 to the second network device. The second network device selects a maximum value from the RSRP 1 to the RSRP 4, and selects a maximum value from the RSRP 5 to the RSRP 8. It is assumed that the selected maximum values are the RSRP 2 and the RSRP 5, and the beam 2 and the beam 5 are used as target beams of the first network device.

The RSRP is used to represent beam quality, and a beam corresponding to one RSRP having a highest value in n RSRPs that correspond to each transceiver is used as the target beam of the $i^{th}$ first network device, so that the first network device can transmit data on a beam having the best quality. This improves a data transmission success rate.

After selecting the target beam of the first network device, the second network device further obtains a gain loss of each target beam, and correspondingly adds each target beam and the gain loss of the target beam to a beam set. In an implementation, the beam set is denoted as $TRX_s\{[BeamId, Gainloss]_t\}$, where $[BeamId, Gainloss]_t$ represents a beam identifier BeamId of a $t^{th}$ beam in beams simultaneously generated by an $s^{th}$ transceiver and a gain loss of the beam caused by multi-beam scheduling. The beam set is an empty set during initial beam allocation.

(2) Select, for each target beam, a $j^{th}$ first network device that is in the first network device set and that is within the coverage of the target beam, estimate resource blocks required by all first network devices that can be scheduled within the coverage of the target beam, and determine, if the resource blocks do not fully occupy a frequency band corresponding to the target beam, whether a modulation and coding scheme (MCS) of each of all the first network devices that can be scheduled within the coverage of the target beam is higher than an admission threshold; allocate, when each MCS is higher than the admission threshold, the target beam to the $j^{th}$ first network device, and update j to j+1; and continue to perform the step of selecting a $j^{th}$ first network device that is in the first network device set and that is within the coverage of the target beam, until the resource blocks fully occupy the frequency band, or until the target beam is allocated to all the first network devices within the coverage of the target beam, the resource blocks still do not fully occupy the frequency band, and each MCS is higher than the admission threshold, and stop beam allocation, where $j \geq 1$.

The $j^{th}$ first network device is a first network device other than the n first network devices within the coverage of the beam set.

The estimating resource blocks required by all first network devices that can be scheduled within the coverage of a target beam includes: calculating, based on a preset beam weight coefficient, a first decreasing value that a gain of the target beam has when the target beam is allocated to the $j^{th}$ first network device, searching a preset mapping table for a second decreasing value of the MCS corresponding to the first decreasing value, where the mapping table is used to reflect a correspondence between the first decreasing value of the gain of the target beam and the second decreasing value of the MCS; decreasing MCSs of all the first network devices that can be scheduled within the coverage of the target beam by a second decreasing value, and estimating, based on a decreased MCS of each first network device, a resource block required by the first network device; and summating the resource blocks required by all the first network devices, to obtain the resource blocks required by all the first network devices that can be scheduled.

When a target beam is allocated to a first network device, a gain loss occurs on the target beam, and the gain loss affects an MCS of the first network device. In addition, the MCS of the first network device determines a resource block required by the first network device. Therefore, the second network device can determine a second decreasing value of the MCS based on the first decreasing value of the gain, and then estimate the resource block required by the first network device based on the second decreasing value of MCS. The resource block may be also referred to as an RB (Resource Block).

In a beam allocation process, after the target beam is allocated to the $j^{th}$ first network device, and when all resource blocks required by all first network devices fully occupy a frequency band, because all beams generated by one transceiver occupy the same frequency band, the transceiver cannot allocate the target beam to another first network device, and also cannot generate another beam. In this case, beam allocation is stopped.

If after the target beam is allocated to the $j^{th}$ first network device, and all resource blocks required by all first network devices do not fully occupy a frequency band, an MCS may be used to determine whether it is OK for the allocating the target beam to the $j^{th}$ network device. This is because a higher MCS indicates better performance of the first network device, and a lower MCS indicates poorer performance of the first network device. Therefore, the second network device may determine, by determining whether MCSs of all the first network devices are higher than the admission threshold, whether to allocate the target beam to the $j^{th}$ first network device. When each MCS is higher than the admission threshold, it indicates that the performance of all the first network devices is relatively good after the target beam is allocated to the $j^{th}$ first network device. In this case, the target beam may be allocated to the $j^{th}$ first network device. When at least one MCS is lower than the admission threshold, it indicates that the performance of at least one first network device is relatively poor after the target beam is allocated to the $j^{th}$ first network device. Because a priority of the first network device to which the target beam has been allocated is higher than a priority of the $j^{th}$ first network device, the target beam cannot be allocated to the $j^{th}$ first network device. In this case, beam allocation is stopped.

After the target beam is allocated to all the first network devices that can be scheduled within the coverage of the target beam, if resource blocks of all the first network devices do not occupy the frequency band, and each MCS is higher than the admission threshold, the second network device updates i to i+1, and continues to allocate the target beam to an $n^{th}$ first network device, that is, performs the following step 3.

After a beam is allocated to a first network device, if a data amount of the user is relatively small, a user scheduling resource of the beam cannot fully occupy a wide frequency band corresponding to an entire high frequency, resulting in relatively low spectrum utilization. Therefore, the beam needs to be allocated to another first network device within the coverage of the beam. In this way, a plurality of users all transmit data by using the beam. This can improve spectrum utilization.

(3) Update i to i+1 after the target beam is allocated to all the first network devices within the coverage of the target beam and when the resource blocks still do not fully occupy the frequency band and each MCS is higher than the admission threshold, select the target beam of the $i^{th}$ first network device from the beams generated by each transceiver, update a gain loss of a target beam already allocated by each transceiver, calculate a capacity gain of a data amount of first network devices that can be currently scheduled relative to a data amount of the first network devices that can be scheduled before the target beam is allocated to the $i^{th}$ first network device, add, when the capacity gain is positive, the target beam of the $i^{th}$ first network device and the gain loss of the target beam to the beam set, and update gain losses of corresponding target beams in the beam set.

When the capacity gain is positive, it indicates that an amount of to-be-transmitted data can be increased after the beam is allocated to the first network device, to increase a cell capacity.

(4) Continue to perform the step of selecting, for each target beam, a $j^{th}$ first network device that is in the first network device set and that is within the coverage of the target beam, until frequency bands corresponding to all target beams are all fully occupied, or until the capacity gain is not positive, and stop beam allocation.

Second, when the second network device is the second network device in the multi-user scenario, the respectively allocating n beams in different directions simultaneously generated by the transceiver to the n first network devices includes the following steps.

(1) When i=1, select a target beam of the $1^{st}$ first network device from beams generated by each transceiver, and allocate the target beam to the $1^{st}$ first network device; add the target beam of the $1^{st}$ first network device and a gain loss of the target beam to a beam set; and update i to i+1.

An implementation process of allocating the target beam to the first network device in the multi-user scenario is the same as the implementation process of allocating the target beam to the first network device in the single-user scenario. For details, refer to descriptions in the single-user scenario. An implementation process of adding the target beam and the gain loss of the target beam to the first network device in the multi-user scenario is the same as the implementation process of adding the target beam and the gain loss of the target beam to the first network device in the single-user scenario. For details, refer to descriptions in the single-user scenario.

(2) Select a target beam of an $i^{th}$ first network device in the n first network devices from the beams generated by each transceiver, and determine whether interference exists between the selected target beam and an already allocated target beam, where i≥2.

An implementation process of allocating the target beam to the first network device in the multi-user scenario is the same as the implementation process of allocating the target beam to the first network device in the single-user scenario. For details, refer to descriptions in the single-user scenario.

In the related art, a technology for detecting whether interference exists between beams is very mature, and details are not described herein.

(3) Allocate, when no interference exists between the selected target beam and the already allocated beam, the selected target beam to the $i^{th}$ first network device, add the target beam of the $i^{th}$ first network device and a gain loss of the target beam to a beam set, update i to i+1, and continue to perform the step of selecting a target beam of an $i^{th}$ first network device in the n first network devices from the beams generated by each transceiver.

An implementation process of adding the target beam and the gain loss of the target beam to the first network device in the multi-user scenario is the same as the implementation process of adding the target beam and the gain loss of the target beam to the first network device in the single-user scenario. For details, refer to descriptions in the single-user scenario.

(4) Forbid, when interference exists between the selected target beam and the already allocated target beam, allocating the selected target beam to the $i^{th}$ first network device.

(5) Select, for each already allocated target beam, a $j^{th}$ first network device within the coverage of the already allocated target beam in the first network device set, estimate resource blocks required by all first network devices that can be scheduled within the coverage of the target beam, and determine, if the resource blocks do not fully occupy a frequency band corresponding to the already allocated target beam, whether an MCS of each of all the first network devices that can be scheduled within the coverage of the target beam is higher than an admission threshold; allocate, when each MCS is higher than the admission threshold, the already allocated target beam to the $j^{th}$ first network device, and update j to j+1; and continue to perform the step of selecting a $j^{th}$ first network device within the coverage of the already allocated target beam in the first network device set, until the resource blocks fully occupy the frequency band, or until the target beam is allocated to all the first network devices within the coverage of the target beam, the resource blocks still do not fully occupy the frequency band, and each MCS is higher than the admission threshold, and stop beam allocation, where j≥1.

An implementation process of this step is the same as the implementation process of step 2 in the single-user scenario. For details, refer to descriptions in the single-user scenario.

(6) Search for m transceivers after the target beam is allocated to all the first network devices within the coverage of the target beam and when the resource blocks still do not fully occupy the frequency band and each MCS is higher than the admission threshold, where all target beams generated by the m transceivers have lowest resource utilization; select the target beam of the $i^{th}$ first network device from the beams generated by each transceiver, update a gain loss of a target beam already allocated by the m transceivers, calculate a capacity gain of a data amount of first network devices that can be currently scheduled relative to a data amount of the first network devices that can be scheduled before the target beam is allocated to the $i^{th}$ first network device, add, when the capacity gain is positive, the target beam of the $i^{th}$ first network device and a gain loss of the target beam to the beam set, and update gain losses of corresponding target beams in the beam set.

Assuming that m is 2, and resource utilization of beams generated by a transceiver 1 and a transceiver 2 is the lowest, the second network device allocates the transceiver 1 and the transceiver 2 to the $i^{th}$ first network device.

When the capacity gain is positive, it indicates that an amount of to-be-transmitted data can be increased after the beam is allocated to the first network device, to increase a cell capacity.

(7) Update i to i+1; and continue to perform the step of selecting a target beam of an $i^{th}$ first network device in the n first network devices from the beams generated by each transceiver, until frequency bands corresponding to all target beams are all fully occupied, or until the capacity gain is not positive, and stop beam allocation.

Figure 4:
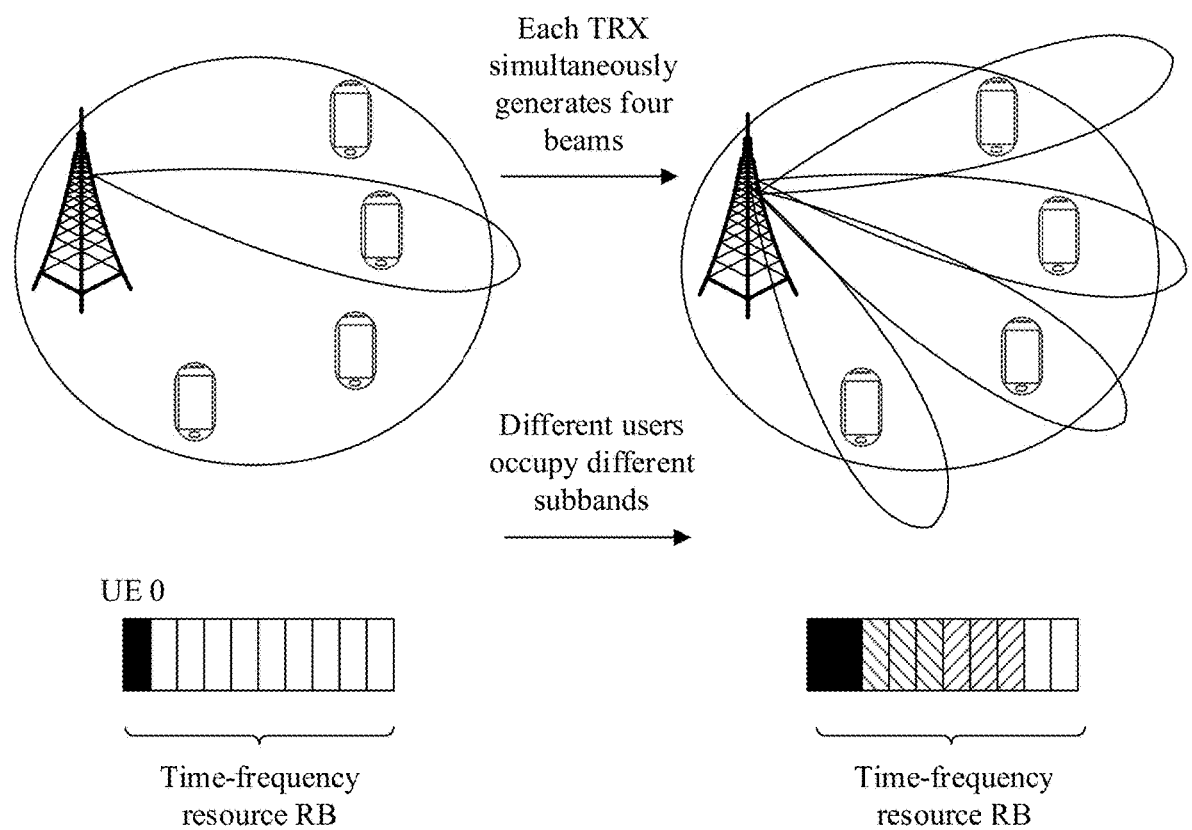
FIG. 4 is a schematic diagram of an application of beam allocation according to an example embodiment of this application.

FIG. 4 is a schematic diagram in which a second network device allocates four beams simultaneously generated by one transceiver to four first network devices. In the figure, UE 0, UE 1, UE 2, and UE 3 are used to represent the four first network devices, and different blocks are used to indicate that each first network device occupies a different subband.

Step 306: Control, after beam allocation is stopped, a first network device within the coverage of each target beam in the beam set to measure a CQI of the first network device, and adjust an MCS of the first network device based on the CQI and a gain loss of the target beam.

In a possible implementation, the first network device subtracts the gain loss of the target beam from the CQI to adjust the MCS of the first network device. In this way, the first network device may modulate and encode data based on actual channel quality of a beam, so that encoded data is suitable for being transmitted on the beam. This improves a data transmission success rate.

In conclusion, according to the beam allocation method provided in this embodiment of this application, one TRX may simultaneously generate n beams in different directions in an instance of scheduling. Because the coverage of the n beams in the different directions is greater than the coverage of one beam, beam coverage during scheduling may be expanded. In addition, users within the coverage of the beams in the different directions generated by the TRX can all simultaneously transmit data, and waiting latency can be avoided.

Linear superposition is performed on the n groups of antenna weights, so that the transceiver can simultaneously generate the n beams in the different directions based on the obtained superposed weights. In this way, beam coverage in an instance of scheduling can be expanded, and a waiting latency can be avoided.

After a beam is allocated to a first network device, if a data amount of the user is relatively small, a user scheduling resource of the beam cannot fully occupy a wide frequency band corresponding to an entire high frequency, resulting in relatively low spectrum utilization. Therefore, the beam needs to be allocated to another first network device within the coverage of the beam. In this way, a plurality of users all transmit data by using the beam, improving spectrum utilization.

When the $i^{th}$ first network device can reuse an already allocated beam, the already allocated beam may be directly allocated to the first network device, to improve spectrum utilization and beam allocation efficiency.

After the beam allocation is stopped, the first network device is controlled to adjust an MCS. In this way, the first network device may modulate and encode data based on the actual channel quality of a beam, so that encoded data is suitable for being transmitted on the beam. This improves a data transmission success rate.

The RSRP is used to represent beam quality, and a beam corresponding to one RSRP having a highest value in n RSRPs that correspond to each transceiver is used as the target beam of the $i^{th}$ first network device, so that the first network device can transmit data on a beam having the best quality. This improves a data transmission success rate.

Apparatus embodiments of this application are provided below, and the apparatus embodiments may be used to execute the method embodiments of this application. For details not disclosed in the apparatus embodiments of this application, refer to the method embodiments of this application.

Figure 5:
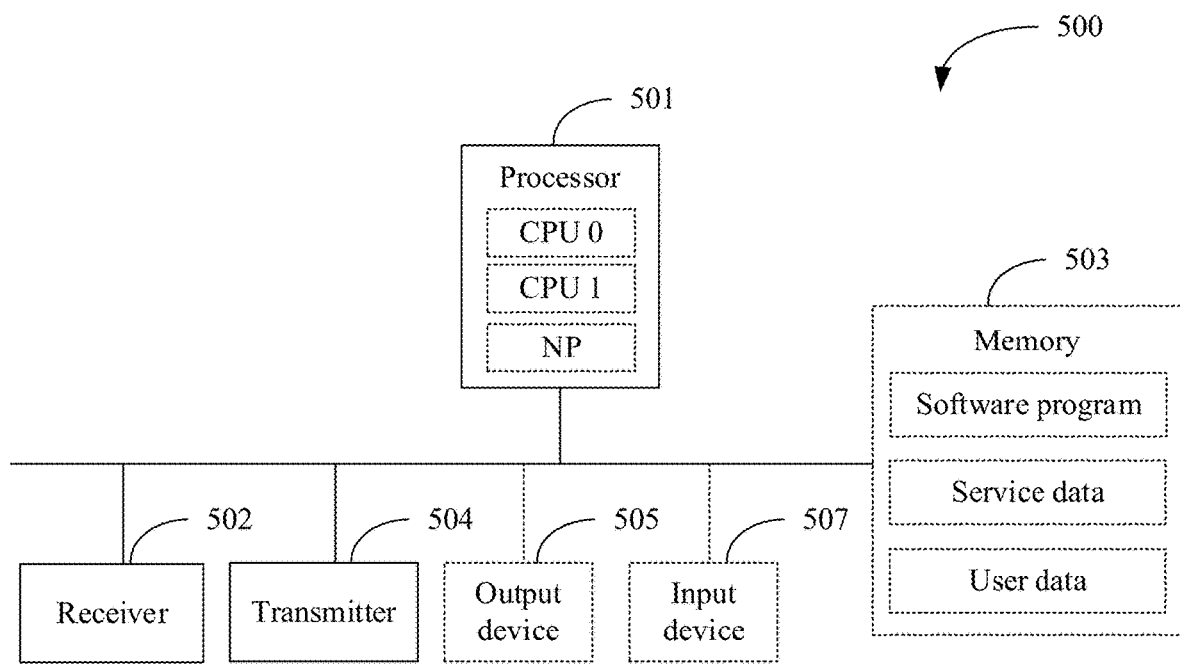
FIG. 5 is a schematic structural diagram of a second network device according to an example embodiment of this application.

FIG. 5 is a schematic structural diagram of a second network device 500 according to an example embodiment of this application. As shown in FIG. 5, the second network device 500 may include: a processor 501, a transmitter 502, a memory 503, and a receiver 504.

The processor 501 may include one or more processing units. The processing unit may be a central processing unit (CPU), a network processor (NP), or the like.

Optionally, the second network device 500 may further include the memory 503. The memory 503 may be configured to store a software program. The software program may be executed by the processor 501. In addition, the memory 503 may further store various types of service data or user data. The software program may include a combination module and an allocation module. Optionally, the software program may further include a superposition module, a generation module, a determining module, a trigger module, and a control module.

The combination module, the allocation module, the superposition module, the generation module, the determining module, the trigger module, and the control module may all be executed by the processor 501. A combination unit 510 may be configured to implement a function of step 301. An allocation unit 520 may be configured to implement functions of step 302 and step 305. A superposition unit may be configured to implement a function of step 303. A generation unit may be configured to implement a function of step 304. A determining unit may be configured to implement a function of determining whether already allocated target beams include a beam that can be reused by an $i^{th}$ first network device. A triggering unit may be configured to implement a function of triggering execution of the step of allocating m transceivers to the first network device, when the already allocated target beams do not include the beam that can be reused by the $i^{th}$ first network device. A controlling unit is configured to implement a function of step 306.

For related details, refer to the method embodiment in FIG. 3.

Optionally, the processor 501 may be connected to the memory 503 by using a bus.

Figure 6:
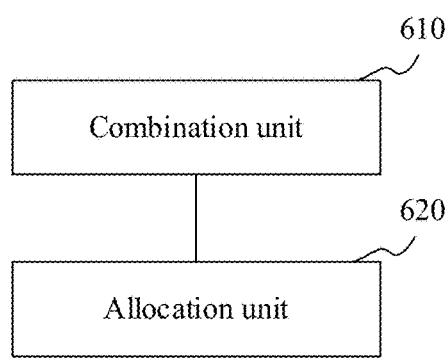
FIG. 6 is a block diagram of a beam allocation apparatus according to an example embodiment of this application.

FIG. 6 is a block diagram of a beam allocation apparatus according to an embodiment of this application. The beam allocation apparatus may be implemented as an entire second network device or a part of a second network device by software, hardware, or a combination thereof. The beam allocation apparatus may include a combination unit 610 and an allocation unit 620.

The combination unit 610 is configured to implement a function of step 301.

The allocation unit 620 is configured to implement functions of step 302 and step 305.

The beam allocation apparatus further includes: a superposition unit, a generation unit, a determining unit, a triggering unit, and a controlling unit. The superposition unit may be configured to implement a function of step 303. The generation unit may be configured to implement a function of step 304. The determining unit may be configured to implement a function of determining whether already allocated target beams include a beam that can be reused by an $i^{th}$ first network device. The triggering unit may be configured to implement a function of triggering, execution of the step of allocating m transceivers to the first network device, when the already allocated target beams do not include the beam that can be reused by the $i^{th}$ first network device. The controlling unit may be configured to implement a function of step 306.

For related details, refer to the method embodiment in FIG. 3.

It should be noted that the combination unit 610, the allocation unit 620, the superposition unit, the generation unit, the determining unit, the triggering unit, and the controlling unit may all be implemented by using a processor in the second network device.

An example embodiment of this application provides a computer-readable storage medium, where the storage medium stores at least one instruction, at least one program, a code set, or an instruction set, and the at least one instruction, the at least one program, the code set, or the instruction set may be loaded and executed by a processor to implement the beam allocation method.

It should be noted that for beam allocation performed by the beam allocation apparatus provided in the foregoing embodiments, only division of the foregoing function modules is used as an example for description. During actual application, the foregoing functions can be allocated to different function modules and implemented according to a requirement. To be specific, an internal structure of the beam allocation apparatus is divided into different function modules to implement all or some of the functions described above. In addition, the beam allocation apparatus provided in the foregoing embodiment and the beam allocation method embodiments belong to a same concept. For a specific implementation process of the apparatus, refer to the method embodiments, and details are not described herein again.

The sequence numbers of the foregoing embodiments of this application are merely for descriptions, and are not intended to indicate priorities of the embodiments.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division may merely be logical function division and may be division in another manner during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product may be stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, an optical disc, or the like.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A beam allocation method, comprising:
determining a first network device set, wherein the first network device set comprises to-be-scheduled first network devices:
allocating transceivers in a second network device to n first network devices in the first network device set, wherein n≥2;
sequentially allocating, when the second network device is in a single-user scenario, all transceivers in the second network device to a first network device in descending order of priorities of the n first network devices in the first network device set;
sequentially determining, when the second network device is in a multi-user scenario, a quantity m of transceivers required by each first network device in descending order of priorities of the n first network devices in the first network device set, and allocating m transceivers to the first network device, wherein m≥1; and
respectively allocating n beams in different directions simultaneously generated by the transceivers to the n first network devices, wherein the n first network devices occupy different subbands in a frequency band corresponding to the beams, and wherein the n first network devices are staggered through frequency division.

2. The method according to claim 1, wherein the n beams each comprise a coverage, and when the second network device is the second network device in the single-user scenario, the step of respectively allocating n beams in different directions simultaneously generated by the transceiver to the n first network devices comprises:
selecting a target beam of an ith first network device in the n first network devices from the beams generated by each transceiver, and adding the target beam of the ith first network device and a gain loss of the target beam to a beam set, wherein i≥1;
selecting, for each target beam, a jth first network device that is in the first network device set and that is within the coverage of the target beam, estimating resource blocks required by all first network devices that can be scheduled within the coverage of the target beam, and determining, if the resource blocks do not fully occupy a frequency band corresponding to the target beam, whether a modulation and coding scheme MCS of each of all the first network devices that can be scheduled within the coverage of the target beam is higher than an admission threshold; allocating, when each MCS is higher than the admission threshold, the target beam to the jth first network device, and updating j to j+1; and continuing to perform the step of selecting a jth first network device that is in the first network device set and that is within the coverage of the target beam, until the resource blocks fully occupy the frequency band, or until the target beam is allocated to all the first network devices within the coverage of the target beam, the resource blocks still do not fully occupy the frequency band, and each MCS is higher than the admission threshold, and stopping beam allocation, wherein j≥1;
updating i to i+1 after the target beam is allocated to all the first network devices within the coverage of the target beam and when the resource blocks still do not fully occupy the frequency band and each MCS is higher than the admission threshold, selecting the target beam of the ith first network device from the beams generated by each transceiver, updating a gain loss of a target beam already allocated by each transceiver, calculating a capacity gain of a data amount of first network devices that can be currently scheduled relative to a data amount of the first network devices that can be scheduled before the target beam is allocated to the ith first network device, adding, when the capacity gain is positive, the target beam of the ith first network device and the gain loss of the target beam to the beam set, and updating gain losses of corresponding target beams in the beam set; and
continuing to perform the step of selecting, for each target beam, a jth first network device that is in the first network device set and that is within the coverage of the target beam, until the frequency band corresponding to all target beams is all fully occupied, or until the capacity gain is not positive, and stopping beam allocation.

3. The method according to claim 2, wherein the method further comprises:
controlling, after beam allocation is stopped, a first network device within the coverage of each target beam in the beam set to measure a channel quality indicator CQI of the first network device, and adjusting an MCS of the first network device based on the CQI and a gain loss of the target beam.

4. The method according to claim 2, wherein the step of selecting a target beam of an ith first network device in the n network devices from the beams generated by each transceiver comprises:
sequentially selecting one of n groups of antenna weights by using each transceiver, and generating, based on the antenna weights, a beam whose direction points to the ith first network device;
receiving n beam reference signal received powers RSRPs that correspond to each transceiver and that are sent by the ith first network device, wherein each RSRP corresponds to one beam generated by the transceiver; and
selecting one RSRP having a greatest value from the n RSRPs corresponding to each transceiver, and using a beam corresponding to the RSRP as the target beam of the ith first network device.

5. The method according to claim 2, wherein the estimating resource blocks required by all first network devices that can be scheduled within the coverage of the target beam comprises:
calculating, based on a preset beam weight coefficient, a first decreasing value that a gain of the target beam has when the target beam is allocated to the jth first network device;
searching a preset mapping table for a second decreasing value of an MCS corresponding to the first decreasing value, wherein the mapping table is used to reflect a correspondence between the first decreasing value of the gain of the target beam and the second decreasing value of the MCS;
decreasing MCSs of all the first network devices that can be scheduled within the coverage of the target beam by the second decreasing value, and estimating, based on a decreased MCS of each first network device, a resource block required by the first network device; and
summating resource blocks required by all the first network devices to obtain the resource blocks required by all the first network devices that can be scheduled.

6. The method according to claim 1, wherein the n beams each comprise a coverage, and when the second network device is in the multi-user scenario, the step of respectively allocating n beams in different directions simultaneously generated by the transceiver to the n first network devices comprises:
  selecting a target beam of an ith first network device in the n first network devices from the beams generated by each transceiver, and determining whether interference exists between the selected target beam and an already allocated target beam, wherein i≥2;
  allocating, when no interference exists between the selected target beam and the already allocated target beam, the selected target beam to the ith first network device, adding the target beam of the ith first network device and a gain loss of the target beam to a beam set, updating i to i+1, and continuing to perform the step of selecting a target beam of an ith first network device in the n first network devices from the beams generated by each transceiver;
  forbidding, when interference exists between the selected target beam and the already allocated target beam, allocating the selected target beam to the ith first network device;
  selecting, for each already allocated target beam, a jth first network device within the coverage of the already allocated target beam in the first network device set, estimating resource blocks required by all first network devices that can be scheduled within the coverage of the already allocated target beam, and determining, if the resource blocks do not fully occupy a frequency band corresponding to the already allocated target beam, whether an MCS of each of all the first network devices that can be scheduled within the coverage of the already allocated target beam is higher than an admission threshold; allocating, when each MCS is higher than the admission threshold, the already allocated target beam to the jth first network device, and updating j to j+1; and continuing to perform the step of selecting a jth first network device within the coverage of the allocated target beam in the first network device set, until the resource blocks fully occupy the frequency band, or until the already allocated target beam is allocated to all the first network devices within the coverage of the already allocated target beam, the resource blocks still do not occupy the frequency band, and each MCS is higher than the admission threshold, and stopping beam allocation, wherein j≥1;
  searching for m transceivers after the already allocated target beam is allocated to all the first network devices within the coverage of the already allocated target beam and when the resource blocks still do not fully occupy the frequency band and each MCS is higher than the admission threshold, wherein all target beams generated by the m transceivers have lowest resource utilization; selecting the target beam of the ith first network device from the beams generated by each transceiver, updating a gain loss of a target beam already allocated by the m transceivers, calculating a capacity gain of a data amount of first network devices that can be currently scheduled relative to a data amount of the first network devices that can be scheduled before the target beam is allocated to the ith first network device, adding, when the capacity gain is positive, the target beam of the ith first network device and a the gain loss of the target beam to the beam set, and updating gain losses of corresponding target beams in the beam set; and
  updating i to i+1; and continuing to perform the step of selecting a target beam of an ith first network device in the n first network devices from the beams generated by each transceiver, until frequency bands corresponding to all target beams are all fully occupied, or until the capacity gain is not positive, and stopping beam allocation.

7. The method according to claim 6, wherein when i=1 and the second network device is the second network device in the multi-user scenario, the step of respectively allocating n beams in different directions simultaneously generated by the transceiver to the n first network devices further comprises:
  selecting a target beam of the 1st first network device from the beams generated by each transceiver;
  allocating the target beam to the 1st first network device;
  adding the target beam of the 1st first network device and a the gain loss of the target beam to a the beam set; and
  updating i to i+1, to trigger execution of the step of selecting a target beam of an ith first network device in the n first network devices from the beams generated by each transceiver, and determining whether interference exists between the selected target beam and an already allocated target beam.

8. The method according to claim 6, wherein when the second network device is the second network device in the multi-user scenario, before the allocating m transceivers to the first network device, the method further comprises:
  determining whether target beams already allocated by the transceiver comprise a beam that can be reused by the ith first network device in the n first network devices; and
  triggering, execution of the step of allocating m transceivers to the first network device when the target beams already allocated by the transceiver do not comprise the beam that can be reused by the ith first network device; and
  allocating the beam to the first network device when the target beams already allocated by the transceiver comprise the beam that can be reused by the ith first network device, updating i to i+1, and continuing to perform the step of sequentially determining a quantity m of transceivers required by each first network device.

9. A beam allocation apparatus comprising:
  a processor, configured to determine a first network device set, wherein the first network device set comprises to-be-scheduled first network devices;
  wherein the processor is configured to:
    allocate transceivers in a second network device to n first network devices in the first network device set, wherein n≥2;
    respectively allocate n beams in different directions simultaneously generated by the transceivers to the n first network devices, wherein the n first network devices occupy different subbands in a frequency band corresponding to the beams, and wherein the n first network devices are staggered through frequency division;
    sequentially allocate, when the second network device is in a single-user scenario, all transceivers in the second network device to a first network device in descending order of priorities of the n first network devices in the first network device set; and
    sequentially determine, when the second network device is in a multi-user scenario, a quantity m of transceivers required by each first network device in descending order of priorities of the n first network devices in the first network device set, and allocate m transceivers to the first network device, wherein m≥1.

10. The apparatus according to claim 9, wherein when the second network device in the single-user scenario, the processor is further configured to:

select a target beam of an ith first network device in the n first network devices from the beams generated by each transceiver, and add the target beam of the ith first network device and a gain loss of the target beam to a beam set, wherein i≥1;

select, for each target beam, a jth first network device that is in the first network device set and that is within a coverage of the target beam, estimate resource blocks required by all first network devices that can be scheduled within the coverage of the target beam, and determine, if the resource blocks do not fully occupy a frequency band corresponding to the target beam, whether a modulation and coding scheme MCS of each of all the first network devices that can be scheduled within the coverage of the target beam is higher than an admission threshold; allocate, when each MCS is higher than the admission threshold, the target beam to the jth first network device, and update j to j+1; and continue to perform the step of selecting a jth first network device that is in the first network device set and that is within the coverage of the target beam, until the resource blocks fully occupy the frequency band, or until the target beam is allocated to all the first network devices within the coverage of the target beam, the resource blocks still do not fully occupy the frequency band, and each MCS is higher than the admission threshold, and stop beam allocation, wherein j≥1;

update i to i+1 after the target beam is allocated to all the first network devices within the coverage of the target beam and when the resource blocks still do not fully occupy the frequency band and each MCS is higher than the admission threshold, select the target beam of the ith first network device from the beams generated by each transceiver, update a gain loss of a target beam already allocated by each transceiver, calculate a capacity gain of a data amount of first network devices that can be currently scheduled relative to a data amount of the first network devices that can be scheduled before the target beam is allocated to the ith first network device, add, when the capacity gain is positive, the target beam of the ith first network device and the gain loss of the target beam to the beam set, and update gain losses of corresponding target beams in the beam set; and continue to perform the step of selecting, for each target beam, a jth first network device that is in the first network device set and that is within the coverage of the target beam, until frequency bands corresponding to all target beams are all fully occupied, or until the capacity gain is not positive, and stop beam allocation.

11. The apparatus according to claim 10, wherein the processor is further configured to:

control, after beam allocation is stopped, a first network device within the coverage of each target beam in the beam set to measure a channel quality indicator CQI of the first network device, and adjust an MCS of the first network device based on the CQI and a gain loss of the target beam.

12. The apparatus according to claim 10, wherein the processor is further configured to:

sequentially select one of n groups of antenna weights by using each transceiver, and generate, based on the antenna weights, a beam whose direction points to the ith first network device;

receive n beam reference signal received powers (RSRPs) that correspond to each transceiver and that are sent by the ith first network device, wherein each RSRP corresponds to one beam generated by the transceiver; and select one RSRP having a greatest value from the n RSRPs corresponding to each transceiver, and use a beam corresponding to the RSRP as the target beam of the ith first network device.

13. The apparatus according to claim 10, wherein the processor is further configured to:

calculate, based on a preset beam weight coefficient, a first decreasing value that a gain of the target beam has when the target beam is allocated to the jth first network device;

search a preset mapping table for a second decreasing value of an MCS corresponding to the first decreasing value, wherein the mapping table is used to reflect a correspondence between the first decreasing value of the gain of the target beam and the second decreasing value of the MCS;

decrease MCSs of all the first network devices that can be scheduled within the coverage of the target beam by the second decreasing value, and estimating, based on a decreased MCS of each first network device, a resource block required by the first network device; and summate resource blocks required by all the first network devices to obtain the resource blocks required by all the first network devices that can be scheduled.

14. The apparatus according to claim 9, wherein when the second network device is in the multi-user scenario, the processor is further configured to:

select a target beam of an ith first network device in the n first network devices from the beams generated by each transceiver, and determine whether interference exists between the selected target beam and an already allocated target beam, wherein i≥2;

allocate, when no interference exists between the selected target beam and the already allocated target beam, the selected target beam to the ith first network device, add the target beam of the ith first network device and a gain loss of the target beam to a beam set, update i to i+1, and continue to perform the step of selecting a target beam of an ith first network device in the n first network devices from the beams generated by the transceiver;

forbid, when interference exists between the selected target beam and the already allocated target beam, allocating the selected target beam to the ith first network device;

select, for each already allocated target beam, a jth first network device within a coverage of the already allocated target beam in the first network device set, estimate resource blocks required by all first network devices that can be scheduled within the coverage of the already allocated target beam, and determine, if the resource blocks do not fully occupy a frequency band corresponding to the already allocated target beam, whether an MCS of each of all the first network devices that can be scheduled within the coverage of the already allocated target beam is higher than an admission threshold; allocate, when each MCS is higher than the admission threshold, the already allocated target beam to the jth first network device, and update j to j+1; and continue to perform the step of selecting a jth first network device within the coverage of the allocated target beam in the first network device set, until the resource blocks fully occupy the frequency band, or until the already allocated target beam is allocated to all the first network devices within the coverage of the already allocated target beam, the resource blocks still do not occupy the frequency band, and each MCS is higher than the admission threshold, and stop beam allocation, wherein $j \geq 1$;

search for m transceivers after the already allocated target beam is allocated to all the first network devices within the coverage of the already allocated target beam and when the resource blocks still do not fully occupy the frequency band and each MCS is higher than the admission threshold, wherein all target beams generated by the m transceivers have lowest resource utilization; select the target beam of the ith first network device from the beams generated by each transceiver, update a the gain loss of a the target beam already allocated by the m transceivers, calculate a capacity gain of a data amount of first network devices that can be currently scheduled relative to a data amount of the first network devices that can be scheduled before the target beam is allocated to the ith first network device, add, when the capacity gain is positive, the target beam of the ith first network device and a the gain loss of the target beam to the beam set, and update gain losses of corresponding target beams in the beam set; and update i to i+1; and continue to perform the step of selecting a target beam of an ith first network device in the n first network devices from the beams generated by each transceiver, until frequency bands corresponding to all target beams are all fully occupied, or until the capacity gain is not positive, and stop beam allocation.

15. The apparatus according to claim 14, wherein when i=1 and the second network device is the second network device in the multi-user scenario, the processor is further configured to:
- select a target beam of the 1st first network device from the beams generated by each transceiver;
- allocate the target beam to the 1st first network device;
- add the target beam of the 1st first network device and a gain loss of the target beam to a the beam set; and
- update i to i+1, to trigger execution of the step of selecting a target beam of an ith first network device in the n first network devices from the beams generated by each transceiver, and determining whether interference exists between the selected target beam and an already allocated target beam.

16. The apparatus according to claim 14, wherein when the second network device is the second network device in the multi-user scenario, the processor is further configured to:
- determine, before the allocation unit allocates the m transceivers to the first network device, whether the target beams allocated by the transceiver comprise a beam that can be reused by the ith first network device in the n first network devices; and
- trigger execution of the step of allocating m transceivers to the first network device when the target beams allocated by the transceiver do not comprise the beam that can be reused by the ith first network device; and
- allocate the beam to the first network device when the target beams allocated by the transceiver comprise the beam that can be reused by the ith first network device, update i to i+1, and continue to perform the step of sequentially determining a quantity m of transceivers required by each first network device.

* * * * *